March 31, 1942.         W. J. MOELLER         2,278,146
COMPOSITE PANEL BOARD
Filed Jan. 13, 1938

INVENTOR.
William J. Moeller
BY
ATTORNEY.

Patented Mar. 31, 1942

2,278,146

UNITED STATES PATENT OFFICE 2,278,146

COMPOSITE PANEL BOARD

William J. Moeller, Mount Healthy, Ohio, assignor to The Philip Carey Manufacturing Company, a corporation of Ohio Application January 13, 1938, Serial No. 184,854

7 Claims. (Cl. 154—45.9)

This invention relates to sheathing composed of two or more bituminized sheets of felt adhered together with a bituminous adhesive layer to provide a composite board which is rigid and and board-like in character.

Heretofore thin flexible sheets have been used for sheathing, having the disadvantage of sagging and subject to being readily torn and punctured. Because of their thin flexible character, they can not be quickly and conveniently applied, and when applied do not aid in reenforcing the building structure to which they are applied. Ordinarily only one layer of sheathing is applied, but where more than one be used, they are separate and distinct with no bonding means for securing them together.

The present invention aims not only to provide a relatively thin composite sheathing of laminated layers but one that is rigid and board-like in character and has the component layers adhesively secured together. These rigid sheathing sheets may be applied readily and quickly like wall panels and provide a plurality of layers in the building structure. While the sheathing may comprise more than two layers, it comprises no less than two and these are preferably of different construction although not necessarily of different composition.

Figure 1:
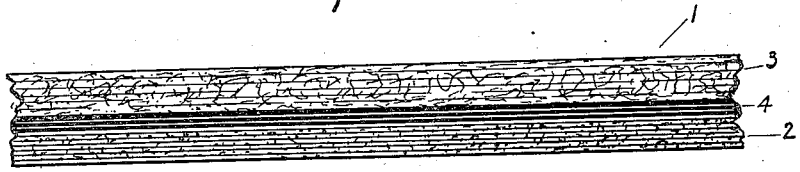
Figure 2:
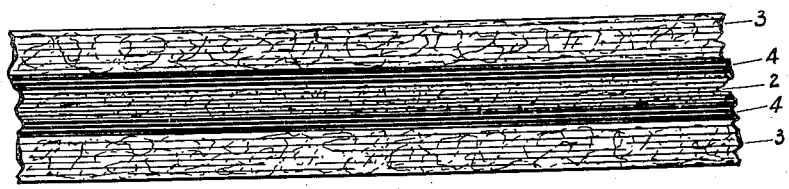

For a better understanding of the invention reference may be made to the accompanying drawing in which:

Fig. 1 is a cross-sectional view of a portion of a sheathing embodying the invention; and Fig. 2 is a cross-sectional view of a portion of another embodiment.

Referring specifically to the drawing in which like numerals are used to designate like parts, numeral 1 designates generally a composite sheathing board composed of layers 2 and 3 adhered together with an adhesive layer 4.

Layer 2 is preferably a felt reconstituted from scrap asphalt roofing. Scrap asphalt roofing, comprising a foundation felt saturated and coated with bituminous composition or similar material with granular mineral material embedded in the bituminous coating, is beaten and ground into a pulped mass suitable for being alone or in combination with other materials, felted into a sheet. Since the roofing scrap contains a large portion of bituminous composition, to which additional bituminous material of the character used for impregnating and coating roofing felts, may be added if desired in the reconstituting process, the resulting reconstituted sheet is already well waterproofed even though no additional waterproofing be added. If, however, additional waterproofing is desired the reconstituted felt may be impregnated with bituminous or other suitable saturant. With or without the saturant applied, the reconstituted felt is of uniform and homogeneous character by reason of the ingredients having been thoroughly intermixed during the beating and grinding process in reconstituting the felt. The mineral ingredient is finely ground and greatly stiffens and rigidifies the sheet although it be felted to the same thickness of ordinary roofing felt.

The other layer 3 may be of reconstituted felt the same as layer 2, or it may be of ordinary roofing felt conventionally saturated with bituminous composition. It is preferably of highly porous felt and may advantageously be made from wood pulp having a cellulose content of about 93 per centum.

Each of the two sheets have a thickness of from .050 to .075 inch, thereby giving a combined thickness exclusive of the asphalt cement layer 4 of about .125 inch.

The cement layer is of higher melting asphalt and of harder consistency than that ordinarily employed for coating roofing felts, thereby cooperating with the two felt sheets to increase the rigidity and board-like character of the composite structure. This together with increased rigidity obtained by the ground mineral in the reconstituted felt produces a composite structure having increased rigidity and stiffness without any increase in the thickness of the layers and without the use of any additional reenforcing materials.

The embodiment shown in Fig. 2 is the same as that in Fig. 1 with two layers 3, one being adhered on each face of the layer 2 by asphalt layers 4. The layers 2 and 3 may be alternately disposed with layer 2 sandwiched between layers 3, or a layer 3 may be sandwiched between layers 2. There is no limitation as to the way in which the layers may be arranged, although the sheets 3 are preferably on the outside since they need to be saturated with a waterproofing material. Layer 2 already contains a waterproofing material and would not need any additional waterproofing as it would be protected, except at the edges, by the waterproofing applied to the cover sheets.

While two embodiments illustrating the invention have been described in detail to show how it may be carried out, there may be various changes without departing from the spirit of the invention.

I claim:

1. A composite panel board comprising two or more flexible fibrous layers adhered together in juxtaposition with a relatively hard thermoplastic adhesive, one of the flexible layers being a felt composed of a homogeneous pulped mass of fibrous, bituminous and mineral materials.

2. A composite panel board comprising two or more flexible fibrous layers adhered together in juxtaposition with a relatively hard thermoplastic adhesive, one of the flexible layers being a felt composed of a homogeneous pulped mass of fibrous, mineral and bituminous materials.

3. A composite panel board comprising two or more flexible fabric layers adhered together in juxtaposition with a relatively hard thermoplastic adhesive, said layers being felt composed of a homogeneous pulped mass of fibrous, bituminous and mineral materials.

4. A composite panel board comprising two or more flexible fibrous layers adhered together in juxtaposition with a relatively hard bituminous adhesive, said layers being felt composed of a homogeneous pulped mass of fibrous, finely divided mineral and bituminous materials.

5. A composite panel board comprising two or more flexible fibrous layers adhered together in juxtaposition, said layers being felt composed of a homogeneous pulped mass of fibrous, finely divided mineral and bituminous materials, and an intervening felt core having no mineral material therein.

6. A relatively thin panel board comprising two or more thin flexible felt layers composed of a homogeneous pulped mass of fibrous, finely divided mineral and bituminous materials, a felt layer free from finely divided mineral material interposed between the mineral containing felt layers, and a relatively hard thermoplastic adhesive for binding the sheet together in superposed relation.

7. A relatively thin but rigid composite panel board consisting of two relatively thin flexible felt layers adhered together in juxtaposition with a thin layer of relatively hard thermoplastic adhesive, one of said felt layers being felted from a mass of grit containing bituminized fibrous material which has been beaten and ground.

WILLIAM J. MOELLER.